Figure 1:
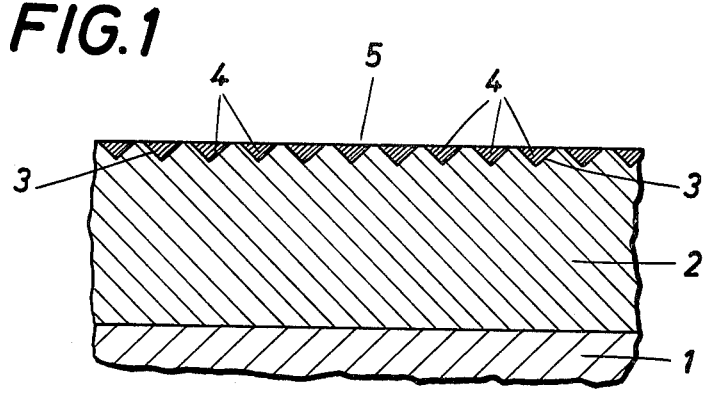

United States Patent [19]

Ehrentraut

[11] 4,400,099

[45] Aug. 23, 1983

[54] SLIDING SURFACE BEARING FOR HEAVY LOADS

[75] Inventor: Otto Ehrentraut, Gmunden, Austria

[73] Assignee: Miba Gleitlager Aktiengesellschaft, Laakirchen, Austria

[21] Appl. No.: 338,062

[22] Filed: Jan. 8, 1982

[30] Foreign Application Priority Data

Feb. 6, 1981 [AT] Austria ................................. 535/81

[51] Int. Cl.$^3$ ............................................ F16C 33/24
[52] U.S. Cl. .................................................. 384/283
[58] Field of Search .................. 308/3 R, 5 R, 241; 384/283, 282, 291, 93, 292, 276

[56] References Cited

U.S. PATENT DOCUMENTS

| | | | |
|---|---|---|---|
| 1,958,089 | 5/1934 | Leis et al. | 384/283 |
| 2,268,868 | 1/1942 | Given | 384/283 |
| 3,235,316 | 2/1966 | Whanger | 384/95 |
| 4,257,654 | 3/1981 | Keepers | 308/241 |

FOREIGN PATENT DOCUMENTS 2251637 5/1973 Fed. Rep. of Germany .
797483 4/1936 France .

Primary Examiner—Lenard A. Footland
Attorney, Agent, or Firm—Kurt Kelman

[57] ABSTRACT

A sliding surface bearings for heavy loads comprises a backing shell and a bearing metal layer provided on said backing shell and formed with axially spaced apart grooves, which extend at an acute angle of at most 15 degrees to the peripheral direction substantially around the axis of the bearing and contain a bearing which is softer than said bearing layer. In order to ensure that the bearing will have a long life, the axial center spacing of the grooves does not exceed an upper limit $$a_o = 250 + 0.5d + 0.01\, d^2$$

where $a_o$ is expressed in micrometers and d is the diameter of the bearing surface in millimeters, and said center spacing in any case does not exceed 10 mm.

8 Claims, 8 Drawing Figures

SLIDING SURFACE BEARING FOR HEAVY LOADS

BACKGROUND OF THE INVENTION

This invention relates to a sliding surface bearing for heavy loads, comprising a backing shell and a bearing metal layer provided on said backing shell and formed with axially spaced apart grooves, which extend at an acute angle of at most 15 degrees to the peripheral direction substantially around the axis of the bearing and contain a bearing material which is softer than said bearing layer.

The requirements to be met by sliding surface bearing are in part conflicting. For instance, good emergency running properties include a low resistance to plastic deformation but this is inconsistent with a high fatigue strength at operating temperatures. In an endeavor to utilize the advantages afforded by different bearing materials while avoiding their disadvantages, sliding surface bearings for heavy loads usually comprise a plurality of layers. A backing shell of steel carries a layer of an aluminum- or copper-base bearing alloy. The bearing alloy layer carries a bearing surface layer of a bearing material, such as white metal or plastic, which is softer than the bearing alloy. That bearing surface layer is supported by the harder bearing alloy layer so that the disadvantages of the several materials used in the bearing cannot become fully effective. But the effects of the undesired properties of these materials cannot be entirely suppressed. A softer bearing surface layer can never have the same fatigue strength and wear resistance as a bearing surface consisting of a harder bearing material, even if the softer bearing surface layer is supported by a harder intermediate layer.

In an endeavor to reduce friction and to increase wear resistance, it has already been proposed in German Early Disclosure 22 51 637 to provide a bearing surface which is not formed by a continuous layer of a single bearing material but comprises a softer bearing material, which is embedded in a layer of a harder bearing metal so that zones of harder and softer bearing materials alternate in the peripheral direction. That proposal has been based on the concept that the harder bearing metal constitutes a carrying skeleton, which will prevent an excessive flow of the softer bearing material to the rubbing surfaces. Because the protruding lands of the carrying skeleton extend transversely to the peripheral direction they may become coated with a thin layer of the softer bearing material. Such sliding surface bearings have not performed as expected, whether ther softer bearing material consisting preferably of a self-lubricating plastic material was contained in axial grooves or in helical grooves formed in the harder bearing material. Surprisingly it has been found that the tendency of the softer bearing material to be spread by friction cannot by considerably reduced.

In another known sliding surface bearing of that kind, described in French Patent Specification No. 797,483, the grooves which receive the softer bearing material are helical and extend at an acute angle to the peripheral direction rather than substantially at right angles thereto so that grinding cuts will be performed in the peripheral direction at the transitions from the softer to the harder bearing material and solid particles disposed at a transition from a softer bearing material to the harder can be forced only to a very small extent from the softer into the harder material but will mainly remain embedded in the softer material, where they will not give rise to local overloads. But these known sliding surface bearings have a relatively low load-carrying capacity.

It is an object of the invention to avoid the above-mentioned disadvantages of the known sliding surface bearings and to provide a sliding surface bearing which is suitable for heavy loads and affords the advantages of softer and harder bearing materials in combination but is free from the disadvantages of such materials.

In a sliding surface bearing of the kind described first hereinbefore this object is accomplished according to the invention in that the axial center spacing of the grooves does not exceed an upper limit $$a_o = 250 + 0.5d + 001d^2$$

where $a_o$ is expressed in micrometers and $d$ is the diameter of the bearing surface in millimeters, and said center spacing in any case does not exceed 10 mm.

It has surprisingly been found that a sliding surface bearing for heavy loads in which said condition is fulfilled will meet all requirements. The conditions resulting from a local overload should depend not only on the properties of one or the other of the bearing materials but on a combination of said properties. For this purpose a sufficiently fine distribution of the softer bearing material over the bearing surface must be ensured. That distribution will depend on the spacing of the grooves, which will be selected in dependence on the area of the surface which carries load at a time, i.e., on the diameter of the bearing surface. A sufficiently fine distribution will be ensured if the spacing is below the above-mentioned upper limit $a_o$, although the groove spacing should not exceed 10 mm even in bearings which are large in diameter.

As it is essential to combine the effects of the softer and harder bearing materials and said combined effect will depend on the distribution of the bearing materials on the bearing surface, the results can be improved by a finer distribution. Particularly good results will be obtained if the axial center spacing of the grooves is below an upper limit $$a_o = 200 + 0.3d + 0.001d^2$$

where $a_o$ is expressed in micrometers and $d$ is the diameter of the bearing surface in millimeters.

There is also a lower limit to the axial center spacing of the grooves, not only with a view to the manufacture but also to ensure that a sufficiently large volume of the softer bearing material will be available in grooves having a desirable cross-sectional shape. If the axial center spacing of the grooves is larger than or equal to a lower limit $$a_u = 25 \; o \; 0.1d$$

where $a_u$ is expressed in micrometers and $d$ is the diameter of the bearing surface in millimeters, all requirements in that respect can be desirably met.

It has been stated hereinbefore that the risk that hard solid particles may become embedded in the harder bearing material depends on the angle between the grooves and the peripheral direction. That risk will be virtually eliminated if the acute angle between the grooves and the peripheral direction is not in excess of 3 degrees. That requirement can be met in a simple manner because the desired small angle will be obtained be necessity if the grooves are helical and spaced apart as stated. If the grooves include small acute angles with the peripheral direction, a disturbance of the hydrodynamic film of lubricant will not be disturbed at the transitions between the harder and softer bearing materials by boundary zones which extend at right angles to the peripheral direction.

Owing to the loads applied and the desired strength, the softer bearing material should be distributed in a desirable manner over the bearing surface and the grooves should have a desirable cross-sectional shape. That cross-sectional shape can be defined by the ratio of the depth t of the grooves to the axial center spacing a of the grooves. That ratio should not exceed an upper limit 0.5 (1500-d)/1500 and should not be less than one-fifth of said upper limit, where d is the diameter of the bearing surface in millimeters. It has been found in practice that particularly desirable results will be obtained if said ratio does not exceed an upper limit of 0.2 (1500-d)/1500. Regardless of the diameter of the bearing surface, that ratio should not be less than 0.03.

Figure 2:
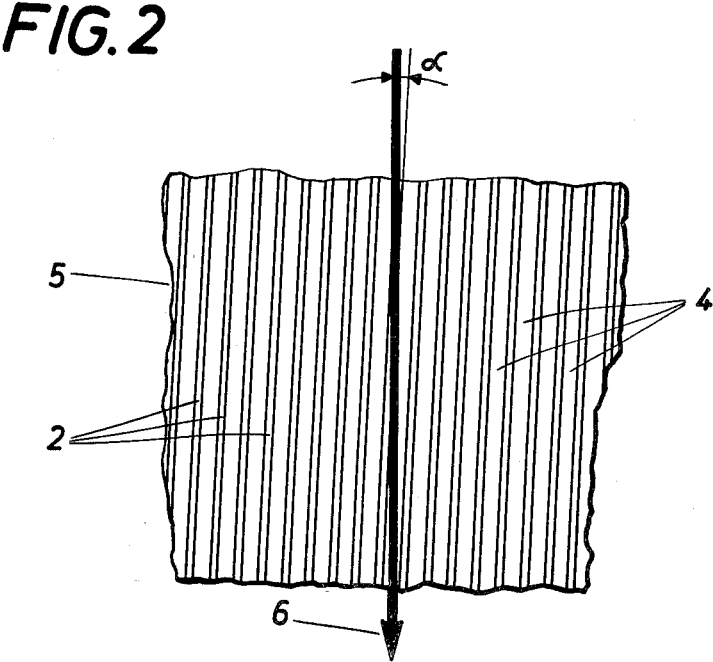
Figure 4:
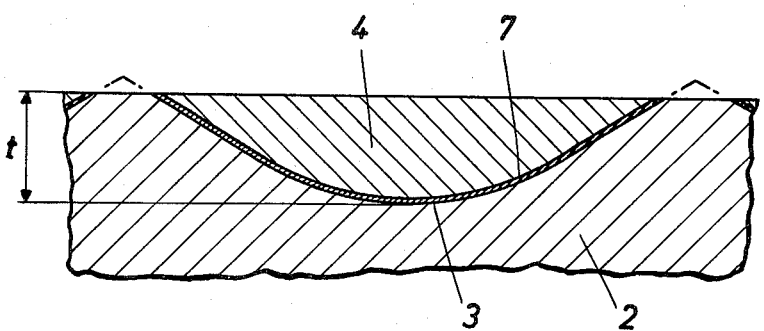
Figure 5:
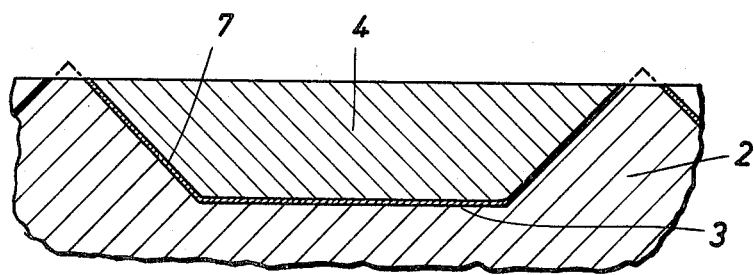
Figure 6:
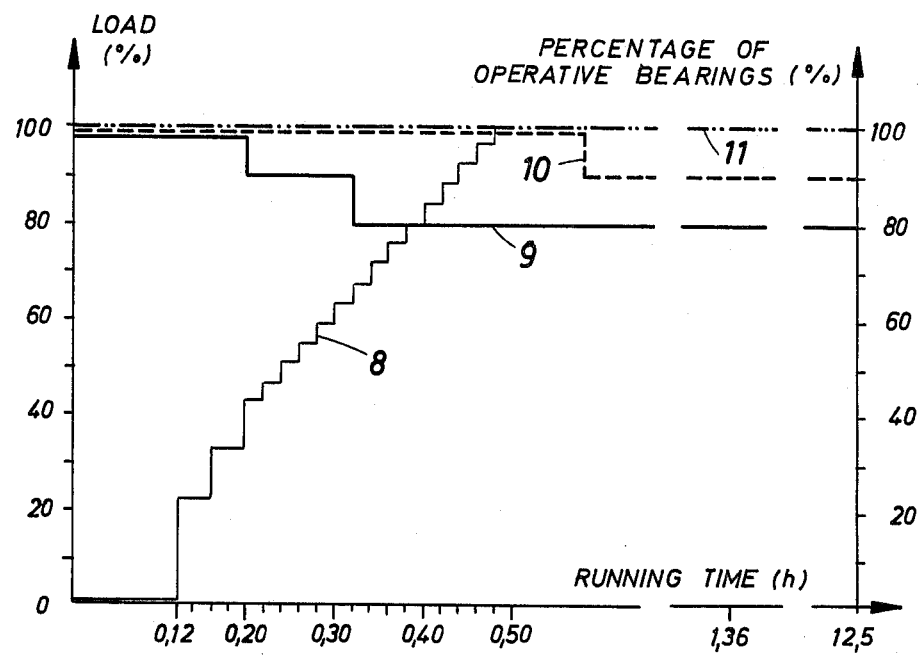
Figure 7:
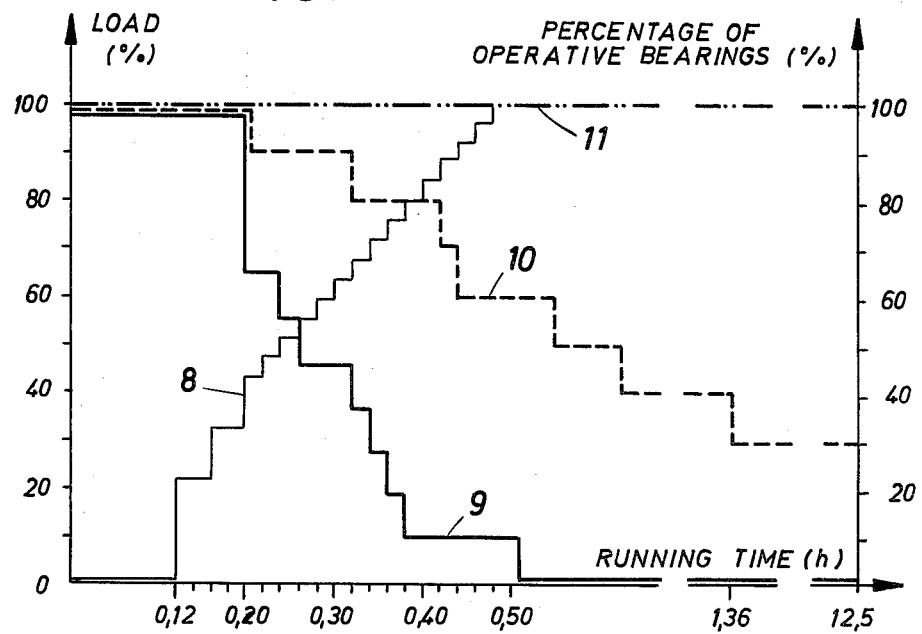
Figure 8:
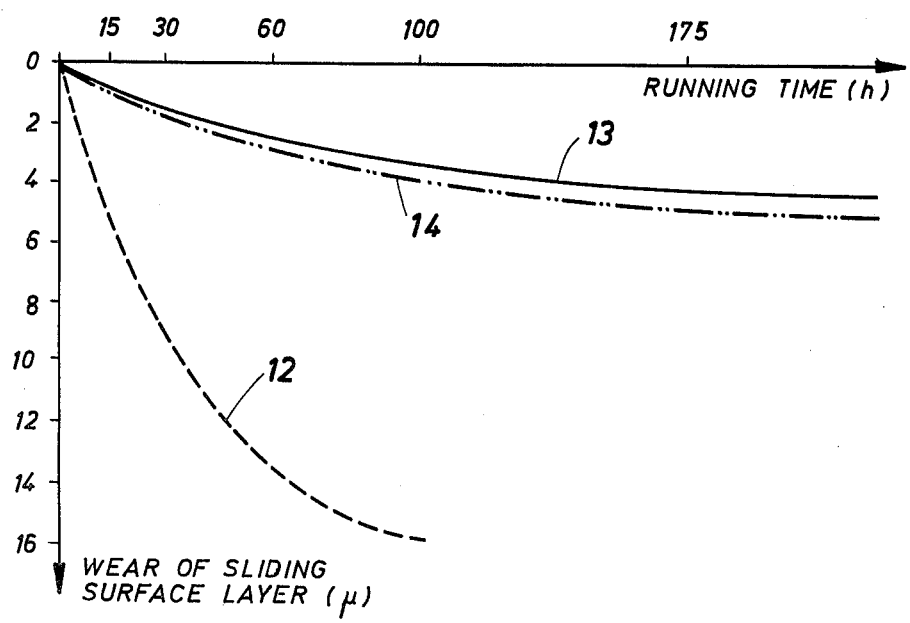

The invention will be explained more in detail with reference to the drawing, in which FIG. 1 is a transverse sectional view showing a sliding surface bearing according to the invention on an enlarged scale, FIG. 2 is a top plan view of a development of the bearing surface of the sliding surface bearing of FIG. 1, FIGS. 3 to 5 show on a larger scale various cross-sectional shapes of the grooves which are filled with the softer bearing material, FIGS. 6 and 7 are representing the average numbers of failures of sliding surface bearings having a bearing surface layer of a shorter bearing material, of surface bearings having a bearing surface layer of a harder bearing material, and of a sliding surface bearing embodying the invention, when said bearings are used under load and lubricated with used oil, and FIG. 8 is a graph which shows the wear of the bearing surface layer in a bearing in which said bearing surface layer consists of a soft bearing material, in a bearing in which said bearing surface layer consists of a hard bearing material, and in a sliding surface bearing embodying the invention, in dependence on running time.

The sliding surface bearing shown in FIGS. 1 and 2 comprises a backing shell 1 of steel, which carries a layer 2 consisting of an aluminum- or copper-base bearing alloy. The bearing alloy layer 2 is formed with grooves 3, which are filled with a bearing material that is softer than the bearing alloy 2, e.g., with a white metal or a plastic material. As is apparent from FIG. 2, the grooves 3 in the bearing surface 5 are helical and include with the peripheral direction 6 an acute angle which is not in excess of 15° and preferably smaller than 3°. Alternatively, the grooves 3 may consist of annular grooves which are closed in themselves.

The distribution of the softer bearing material 4 over the bearing surface will be decisive for the load-carrying capacity of the sliding surface bearing. That distribution can be defined by the axial center spacing a of the grooves 3. That axial center spacing a will be selected in dependence on diameter d of the bearing surface 5. The proportion of the area of the softer bearing material 4 in the total area of the bearing surface 5 will also be significant. In general the area of the softer bearing material 4 should be at least one-half of the area of the bearing surface 5. For special purposes, the area of the softer bearing material may constitute less than one-half of the area of the bearing surface is a favorable combination of materials is used and the grooves are provided in a very fine distribution.

Figure 3:
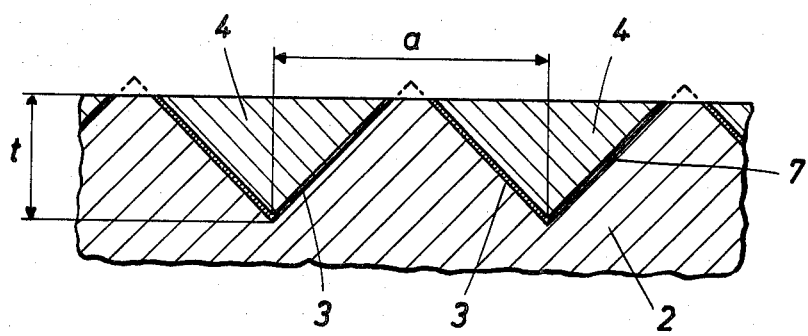

As is shown in FIGS. 3 to 5, the grooves may vary greatly in cross-sectional shape. The cross-sectional shape should be so selected that the ration of the groove depth t to the center spacing a of the grooves is within certain limits, which depend also on the bearing surface diameter d. By the selection of said ratio within such limits it can be ensured in a particularly desirable manner that in any locally confined area subjected to a load the two bearing materials will not become separately effective but will become effective in a combination which is free from the disadvantages of either material. The wear of the bearing will depend mainly on the properties of the harder bearing alloy layer 2. The supporting action of the lands of the layer 2 between the grooves 3 prevents a spreading of the softer bearing material 4 over a large surface by plastic deformation. Such a spreading would restrict the bearing clearance. Owing to the selected arrangement of the grooves, any solid particles disposed at the transition between the softer bearing material 4 and the bearing alloy layer 2 cannot be forced into the harder bearing material, where they would be disturbing; on the contrary, any solid particles will be forced away from the lands of the harder bearing material and into the region of the softer material and will be received by the latter so that they cannot disturb. As a result, the influence of such solid particles on friction is greatly reduced.

Owing to its supporting function, the harder bearing material results in a relief of the softer bearing material from forces tending to deform the softer bearing material so that its fatigue strength and wear resistance will be increased. By a suitable selection of the shape and relative dimensions of the grooves 3 the resistance of the softer bearing material to deformation can be reduced so that the softer bearing material can more easily adapt itself to deviations in geometry.

In the usual manner, a barrier layer 7 consisting, e.g., of a nickel-base alloy, may be provided between the softer bearing material 4 and the harder bearing material 2.

In order to show the results produced by the measures proposed by the invention, known bearings and a sliding surface bearing according to the invention have been compared as regards their susceptibility to dirt. This comparison is shown in FIGS. 6 and 7. The runnint time of the bearings in hours is plotted along the axis of abscissas. The load was increased in steps from zero to a maximum. By reference to line 8, the percentage load on the bearings can be read from the left-hand axis of ordinates. The full load corresponds to the operating conditions obtained in heavy-duty internal combustion engines. By reference to the solid line 9 it can be seen that 20 of 100 sliding surface bearing having a bearing layer consisting of an aluminum-tin alloy and no softer bearing surface layer failed before the full load was applied. When such bearings provided with a softer bearing surface layer, e.g., of a white metal, were tested only 10 of 100 bearings failed and that failure did not occur unless the full load was applied. This is clearly indicated by the dotted line 10. The dash-dot line 11 indicates that no bearings embodying the invention failed under the same conditions. That superior performance of the sliding surface bearing according to the invention in comparison even with a sliding surface bearing having a continuous sliding surface bearing of a softer bearing material can be explained by the fact that the wear is greatly reduced. In a bearing having a continuous bearing surface layer of a softer, rapidly wearing bearing material the same conditions as in a properly matched sliding surface bearing having a bearing surface layer of a hard bearing material will be obtained soon so that the advantages afforded by the softer bearing material will be substantially eliminated when most of the soft bearing material has been worn off after a certain running time.

Similar effects are clearly apparent from FIG. 7, which represents the results of tests of bearings having a bearing alloy layer consisting of an even harder lead-bronze bearing alloy so that the bearings are even more susceptible to dirt. From line 9 it is apparent that all bearings having a continuous bearing surface fromed by the hard bearing alloy failed soon after the full load had been applied. Only 30% of the bearings having a continuous bearing surface layer of a soft bearing material did not fail, as is indicated by line 10. The superiority of the sliding surface bearing according to the invention in this test is clearly apparent from line 11.

The wear of the various types of bearings is shown in the graph of FIG. 8, where the wear of the sliding surface layer in micrometers is plotted along the axis of ordinates and the running time in hours is plotted along the axis of abscissas. Line 12 relates to a sliding surface bearing which has a bearing surface layer consisting of a soft bearing material and shows that the life of such bearings is greatly limited by the removal of material, i.e., by wear. Much more favorable results have been obtained, as expected, with bearings having a continuous bearing surface consisting of a hard bearing alloy. The solid line 13 is much flatter and indicates a relatively small wear. As is apparent from line 14, sliding surface bearings according to the invention have only a slightly lower wear resistance than bearings having a continuous bearing surface consisting of a hard bearing material. But FIGS. 6 and 7 prove that in spite of this high wear resistance the bearings according to the invention are free from the inherent disadvantages of known sliding surface bearings having a high wear resistance.

It has been found that sliding surface bearings according to the invention may comprise even bearing materials which are so strong and hard that they usually cannot be used for that purpose.

Whereas the invention is mainly intended for cylindrical bearings, the concept of the invention obviously can be applied also to thrust bearings. In thrust bearings, the grooves will be circular or spiral, the spacing of the grooves will be measured in a radial rather than in an axial direction, the peripheral direction will be the direction of the tangent to the groove and the effective diameter d of the bearing surface will be the mean diameter of the bearing surface.

What is claimed is:

1. In a sliding surface bearing for heavy loads, comprising
    a backing and
    a bearing metal layer carried by said backing and formed with a plurality of grooves, which contain a bearing material that is softer than said bearing metal layer and together with said bearing metal layer constitutes a bearing surface which is centered on an axis, wherein said grooves are spaced transversely to a peripheral direction related to said axis and substantially surround said axis and include with said peripheral direction an acute angle of up to 15 degrees,
    the improvement residing in that
    the center spacing of said grooves measured at right angles to said peripheral direction is not in exces of 10 millimeters and not in excess of an upper limit $$a_o = 250 + 0.5d + 0.01d^2$$

where $a_o$ is expressed in micrometers and d is the effective diameter of said bearing surface in millimeters.

2. The improvement set forth in claim 1, as applied to a cylindrical bearing in which said backing is a shell surrounding said bearing metal layer, said bearing surface is cylindrical, and said grooves are spaced apart along said axis, wherein
    the center spacing of said grooves measured along said axis is not in excess of 10 millimeters and not in excess of an upper limit $$a_o = 250 + 0.5d + 0.01d^2$$

where $a_o$ is expressed in micrometers and d is the diameter of said cylindrical bearing surface in millimeters.

3. The improvement set forth in claim 2, wherein said acute angle between said grooves and said peripheral direction is not in excess of 3 degrees.

4. The improvement set forth in claim 1, wherein the center spacing of said grooves measured at right angles to said peripheral direction is not in excess of an upper limit $$a_o = 200 + 0.3d + 0.001d^2$$

where $a_o$ is expressed in micrometers and d is the effective diameter of said bearing in millimeters.

5. The improvement set forth in claim 1, wherein the center spacing of said grooves measured at right angles to said peripheral direction is not less than a lower limit $$a_u = 25 + 0.1d$$

where $a_u$ is expressed in micrometers and d is the effective diameter of said bearing surface in millimeters.

6. The improvement set forth in claim 5, wherein said ratio is not less than one-fifth of said upper limit thereof.

7. The improvement set forth in claim 5, wherein the ratio of the depth of said grooves to said center spacing is at least 0.03 and not less than an upper limit defined by the condition $$t/a \leq 0.2 \ 1500\text{-}d/1500$$

where
    d is the effective diameter of said bearing surface in millimeters
    t is the depth of said grooves and
    a is said center spacing.

8. The improvement set forth in claim 1, wherein the ratio of the depth of said grooves to said center spacing is at least 0.03 and not less than an upper limit defined by the condition $$t/a \leq 0.5 \ 1500\text{-}d/1500$$

where
    d is the effective diameter of said bearing surface in millimeters
    t is the depth of said grooves and
    a is said center spacing.

* * * * *